(12) United States Patent
Kraeling et al.

(10) Patent No.: US 11,039,055 B2
(45) Date of Patent: Jun. 15, 2021

(54) VIDEO SYSTEM AND METHOD FOR DATA COMMUNICATION

(71) Applicant: General Electric Company, Schenectady, NY (US)

(72) Inventors: Mark Bradshaw Kraeling, Melbourne, FL (US); Michael Scott Miner, Melbourne, FL (US); Shannon Joseph Clouse, Lawrence Park, PA (US); Anwarul Azam, Lawrence Park, PA (US); Matthew Lawrence Blair, Lawrence Park, PA (US); Nidhi Naithani, Bangalore (IN); Dattaraj Jagdish Rao, Bangalore (IN); Anju Bind, Bangalore (IN); Sreyashi Dey Chaki, Bangalore (IN); Scott Daniel Nelson, Melbourne, FL (US); Nikhil Uday Naphade, Maharashtra (IN); Wing Yeung Chung, Erie, PA (US); Daniel Malachi Ballesty, Lawrence Park, PA (US); Glenn Robert Shaffer, Erie, PA (US); Jeffrey James Kisak, Erie, PA (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 0 days.

(21) Appl. No.: 16/136,423

(22) Filed: Sep. 20, 2018

(65) Prior Publication Data
US 2019/0020807 A1 Jan. 17, 2019

Related U.S. Application Data

(60) Division of application No. 14/541,370, filed on Nov. 14, 2014, now Pat. No. 10,110,795, which is a
(Continued)

(51) Int. Cl.
H04N 5/232 (2006.01)
B60R 1/00 (2006.01)
H04N 7/18 (2006.01)

(52) U.S. Cl.
CPC ......... *H04N 5/23203* (2013.01); *B60R 1/002* (2013.01); *H04N 5/23206* (2013.01); *H04N 7/185* (2013.01)

(58) Field of Classification Search
CPC .................................................. B65H 54/22
(Continued)

(56) References Cited

U.S. PATENT DOCUMENTS 5,689,577 A * 11/1997 Arata ...................... G06T 17/20
345/423
7,493,202 B2 2/2009 Demro et al.
(Continued)

FOREIGN PATENT DOCUMENTS

CN 1802678 A 7/2006
CN 101180803 A 5/2008
(Continued)

OTHER PUBLICATIONS

Machine translated the previously cited Korean Patent Document 2014-0017735 which was published on Feb. 12, 2014. (18 pages).
(Continued)

*Primary Examiner* — Mohammad J Rahman
(74) *Attorney, Agent, or Firm* — Josef L. Hoffmann; The Small Patent Law Group, LLC

(57) ABSTRACT

A camera system and method capture image data with a camera, a data storage device electrically connected to the camera and configured to store the video data and/or a communication device electrically connected to the camera and configured to communicate the image data to a system receiver located remote from the camera. The system
(Continued)

receiver may be located onboard a vehicle such that an operator can carry the camera off board the vehicle and communicate the image data back to the vehicle, when performing, for example, work on the vehicle or inspecting the vehicle or the environs of the vehicle.

19 Claims, 9 Drawing Sheets

Related U.S. Application Data continuation-in-part of application No. 14/217,672, filed on Mar. 18, 2014, and a continuation-in-part of application No. 14/253,294, filed on Apr. 15, 2014, now Pat. No. 9,875,414, and a continuation-in-part of application No. 14/457,353, filed on Aug. 12, 2014, and a continuation-in-part of application No. 14/479,847, filed on Sep. 8, 2014, now abandoned, and a continuation-in-part of application No. 14/485,398, filed on Sep. 12, 2014, now Pat. No. 10,049,298, and a continuation-in-part of application No. 13/109,209, filed on May 17, 2011, now Pat. No. 8,913,131, which is a division of application No. 11/146,831, filed on Jun. 6, 2005, now Pat. No. 7,965,312, which is a continuation-in-part of application No. 10/361,968, filed on Feb. 10, 2003, now abandoned, said application No. 14/479,847 is a continuation-in-part of application No. 14/217,672, filed on Mar. 18, 2014.

(60) Provisional application No. 61/940,813, filed on Feb. 17, 2014, provisional application No. 61/940,660, filed on Feb. 17, 2014, provisional application No. 61/940,610, filed on Feb. 17, 2014, provisional application No. 61/940,696, filed on Feb. 17, 2014, provisional application No. 60/626,573, filed on Nov. 10, 2004, provisional application No. 60/385,645, filed on Jun. 4, 2002.

(58) Field of Classification Search
USPC .................................................. 348/142–148
See application file for complete search history.

(56) References Cited

U.S. PATENT DOCUMENTS

| | | | | |
|---|---|---|---|---|
| 7,571,051 | B1* | 8/2009 | Shulman | G01C 11/00 |
| | | | | 348/142 |
| 7,965,312 | B2 | 6/2011 | Chung et al. | |
| 9,019,431 | B2* | 4/2015 | Phillips | H04N 5/2252 |
| | | | | 348/376 |
| 9,024,842 | B1* | 5/2015 | Prada Gomez | G06F 3/017 |
| | | | | 345/156 |
| 9,405,432 | B2* | 8/2016 | Vats | G06F 3/011 |
| 10,271,015 | B2* | 4/2019 | Haler | G01S 5/0009 |
| 10,272,848 | B2* | 4/2019 | Troxel | G07C 5/0866 |
| 10,656,096 | B2* | 5/2020 | Naderhirn | F03D 80/50 |
| 2004/0059582 | A1* | 3/2004 | Kumhyr | G10L 15/30 |
| | | | | 704/275 |
| 2004/0156616 | A1* | 8/2004 | Strub | G11B 27/3027 |
| | | | | 386/224 |
| 2005/0068171 | A1* | 3/2005 | Kelliher | G08B 21/0283 |
| | | | | 340/539.22 |
| 2006/0132602 | A1 | 6/2006 | Muto et al. | |
| 2006/0133476 | A1* | 6/2006 | Page | G08B 13/1968 |
| | | | | 375/240.01 |
| 2006/0261207 | A1* | 11/2006 | Woodruff | E04H 12/185 |
| | | | | 242/473.3 |
| 2007/0005202 | A1 | 1/2007 | Breed | |
| 2007/0027583 | A1 | 2/2007 | Tamir | |
| 2007/0040121 | A1* | 2/2007 | Kalayeh | G01S 17/86 |
| | | | | 250/342 |
| 2008/0128563 | A1 | 6/2008 | Kumar et al. | |
| 2009/0009597 | A1* | 1/2009 | Belkin | G08B 13/19636 |
| | | | | 348/143 |
| 2009/0315722 | A1* | 12/2009 | Hou | G08B 17/125 |
| | | | | 340/578 |
| 2009/0320239 | A1* | 12/2009 | Keranen | G06F 1/1616 |
| | | | | 16/223 |
| 2010/0231687 | A1* | 9/2010 | Amory | H04N 5/23238 |
| | | | | 348/36 |
| 2011/0055211 | A1* | 3/2011 | Mei | H04N 21/26613 |
| | | | | 707/737 |
| 2011/0182526 | A1* | 7/2011 | Yim | G06T 5/001 |
| | | | | 382/254 |
| 2011/0202212 | A1* | 8/2011 | Gatten | B60D 1/481 |
| | | | | 701/22 |
| 2011/0216200 | A1 | 9/2011 | Chung | |
| 2012/0022719 | A1* | 1/2012 | Matos | G08G 5/0013 |
| | | | | 701/2 |
| 2012/0135775 | A1* | 5/2012 | Drozt | H04L 65/403 |
| | | | | 455/518 |
| 2012/0140077 | A1 | 6/2012 | Muto et al. | |
| 2012/0176500 | A1 | 6/2012 | Muto et al. | |
| 2012/0268597 | A1* | 10/2012 | Mizuno | G06Q 50/22 |
| | | | | 348/143 |
| 2013/0050401 | A1* | 2/2013 | Tannhaeuser | H04N 5/247 |
| | | | | 348/36 |
| 2013/0050486 | A1* | 2/2013 | Omer | H04N 7/185 |
| | | | | 348/144 |
| 2014/0092251 | A1* | 4/2014 | Troxel | G07C 5/0866 |
| | | | | 348/148 |
| 2014/0151512 | A1 | 6/2014 | Cooper et al. | |
| 2014/0268046 | A1* | 9/2014 | Narasimha-Iyer | A61B 3/102 |
| | | | | 351/206 |
| 2014/0283086 | A1* | 9/2014 | Schultz | G01C 11/00 |
| | | | | 726/26 |
| 2014/0313333 | A1 | 10/2014 | Le et al. | |
| 2015/0050003 | A1* | 2/2015 | Ross | H04N 5/77 |
| | | | | 386/201 |
| 2015/0086175 | A1* | 3/2015 | Lorenzetti | H04N 9/8211 |
| | | | | 386/226 |

FOREIGN PATENT DOCUMENTS

| | | |
|---|---|---|
| CN | 102436738 A | 5/2012 |
| CN | 103416050 A | 11/2013 |
| CN | 104112127 A | 10/2014 |
| EP | 0953491 A1 | 3/1999 |
| JP | 2008247154 A | 10/2008 |
| KR | 20130119633 A | 11/2013 |
| KR | 20140017735 A | 2/2014 |
| WO | 2012150591 A2 | 11/2012 |

OTHER PUBLICATIONS

First Office Action and Search issued in connection with corresponding CN Application No. 201580020130.4 dated Nov. 13, 2018.
Second Office Action issued in connection with corresponding CN Application No. 201580020130.4 dated Apr. 16, 2019.
The First Office Action issued in connection with corresponding CN Application No. 201580020135.7 dated Jan. 29, 2019.
Examination Report for corresponding AU Application No. 2015217536 dated Mar. 14, 2019 (3 pages).
Second Examination Report dated Sep. 9, 2019 for corresponding AU Application No. 2015217535.
Office Action dated Sep. 9, 2019 for corresponding JP Application No. 2015-173383.
English Translation of the Office Action dated Sep. 9, 2019 for corresponding JP Application No. 2015-173383.
First Examination Report for corresponding AU Application No. 2015217535 dated Jun. 5, 2019 (3 pages).
Examination report No. 4 for AU application 2015217470 dated Apr. 18, 2018 (4 pages).

(56) References Cited

OTHER PUBLICATIONS

Examination report No. 1 for AU application 2018202825 dated Aug. 15, 2019 (5 pages).
Second Examination Report dated Nov. 1, 2019 for corresponding AU Application No. 2018202825.
Final Office Action dated Dec. 17, 2019 for Japanese Application No. 2015-173383.
Examination Report dated Feb. 11, 2020 for Australian Application No. 2018202825.
Fourth Examination Report dated Apr. 17, 2020 for corresponding Australian patent application No. 2018202825 (4 pages).
Fifth Examination Report dated Jul. 13, 2020 for corresponding Australian patent application No. 2018202825.
Office Action dated Nov. 3, 2020 for corresponding Chinese Patent Application No. 2019108511987 (7 pages).
English translation of the Office Action dated Nov. 3, 2020 for corresponding Chinese Patent Application No. 2019108511987 (5 pages).
Examination Report dated Nov. 5, 2020 for corresponding Australian Patent Application No. 2019205977 (5 pages).

* cited by examiner

VIDEO SYSTEM AND METHOD FOR DATA COMMUNICATION

CROSS-REFERENCE TO RELATED APPLICATIONS

This application is a divisional of U.S. application Ser. No. 14/541,370 filed 14 Nov. 2014.

U.S. application Ser. No. 14/541,370 claims priority to U.S. Provisional Application Nos. 61/940,813; 61/940,660; 61/940,610; and 61/940,696, all of which were filed on 17 Feb. 2014, and the entire disclosures of which are incorporated herein by reference.

U.S. application Ser. No. 14/541,370 also is a continuation-in-part of U.S. patent application Ser. No. 14/217,672, which was filed on 18 Mar. 2014 (the "'672 Application"); U.S. patent application Ser. No. 14/253,294, which was filed on 15 Apr. 2014 (the "'294 Application") and issued as U.S. Pat. No. 9,875,414 on 23 Jan. 2018; U.S. patent application Ser. No. 14/457,353, which was filed on 12 Aug. 2014 (the "'353 Application"); U.S. patent application Ser. No. 14/479,847, which was filed on 8 Sep. 2014 (the "'847 Application") and is now abandoned; U.S. patent application Ser. No. 14/485,398 (the "'398 Application"), which was filed on 12 Sep. 2014 and issued as U.S. Pat. No. 10,049,298 on 14 Aug. 2018; and U.S. patent application Ser. No. 13/109,209, which was filed on 17 May 2011 (the "'209 Application") and issued as U.S. Pat. No. 8,913,131 on 16 Dec. 2014. The '209 Application is a divisional application of U.S. patent application Ser. No. 11/146,831, which was filed on 6 Jun. 2005 and is now U.S. Pat. No. 7,965,312 (the "'831 Application"), which claims priority to U.S. Provisional Application No. 60/626,573, which was filed on 10 Nov. 2004 (the "'573 Application"). The '831 Application also is a continuation-in-part of U.S. patent application Ser. No. 10/361,968, which was filed on 10 Feb. 2003 (the "'968 Application") and is now abandoned, and which claims priority to U.S. Provisional Application No. 60/385,645, which was filed on 4 Jun. 2002 (the "'645 Application"). The '847 Application is a continuation-in-part of the '672 Application. The entire disclosures of these applications (e.g., the '672 Application, the '294 Application, the '353 Application, the '847 Application, the '398 Application, the '209 Application, the '831 Application, the '573 Application, the '968 Application, and the '645 Application) are incorporated herein by reference.

The '353 Application and the '398 Application each claim priority to U.S. Provisional Application Nos. 61/940,813; 61/940,660; 61/940,610; and 61/940,696.

FIELD

Embodiments of the subject matter disclosed herein relate to obtaining and communicating video data, such data may be associated with equipment or a transportation network.

BACKGROUND

Equipment may be sometimes outfitted with camera units for capturing and storing video data of the environment around the vehicle. For example, law enforcement vehicles may be provided with "dashboard cams" to record a view out the front windshield of the vehicle, to capture video data of interactions between a law enforcement officer and (for example) the occupants of another vehicle. As another example, passenger automobiles may be provided with fixed-position rear view cameras for capturing a video stream of the region directly behind the automobile, which is displayed on a console display screen to aid the driver in safely backing up.

In addition to in-vehicle cameras, transportation networks (referring to infrastructure for movement of vehicles, e.g., railroad track networks for rail vehicles, or highway and other road networks for automobiles, semi-trailer trucks, and other on-highway vehicles) are sometimes outfitted with wayside cameras for capturing video data of the transportation network. For example, a camera may be affixed to a mast at the side of a highway, to capture video data of the highway for traffic tracking and reporting purposes.

For both in-vehicle and wayside camera systems, it is typically the case that the camera systems are fixed in place, to capture video data only of a designated field of view, e.g., to the front or rear of a vehicle, or a designated segment of road. For vehicles, this is because the camera systems are designated for capturing video data that may be safety critical (rear view) or important from a public-policy standpoint (law enforcement dashboard cams). For wayside camera systems, this is because the designated field of view must be constantly monitored (e.g., view of a tollgate), or to keep data consistent (e.g., roadway monitoring over time).

BRIEF DESCRIPTION

In one embodiment, a system (e.g., a camera or video system) includes a camera, at least one of a data storage device and/or a communication device, a camera supporting object, a locator device, and a control unit. The camera can be configured to capture at least image data. The data storage device can be electrically coupled to the camera and configured to store the image data. The communication device can be electrically coupled to the camera and configured to communicate the image data to a system receiver. The camera supporting object can be coupled to the camera. The locator device can be configured to detect a location of the camera supporting object. The control unit can be configured to communicate with the system receiver and the locator device, and to control the camera based at least in part on the location of the camera supporting object.

In another embodiment, a method (e.g., for obtaining and/or communicating image data) includes obtaining image data from a camera configured to capture image data (where the camera can be supported by a camera supporting object), determining a location of the camera supporting object, and controlling the camera based at least in part on the location of the camera supporting object that is detected by the locator device.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
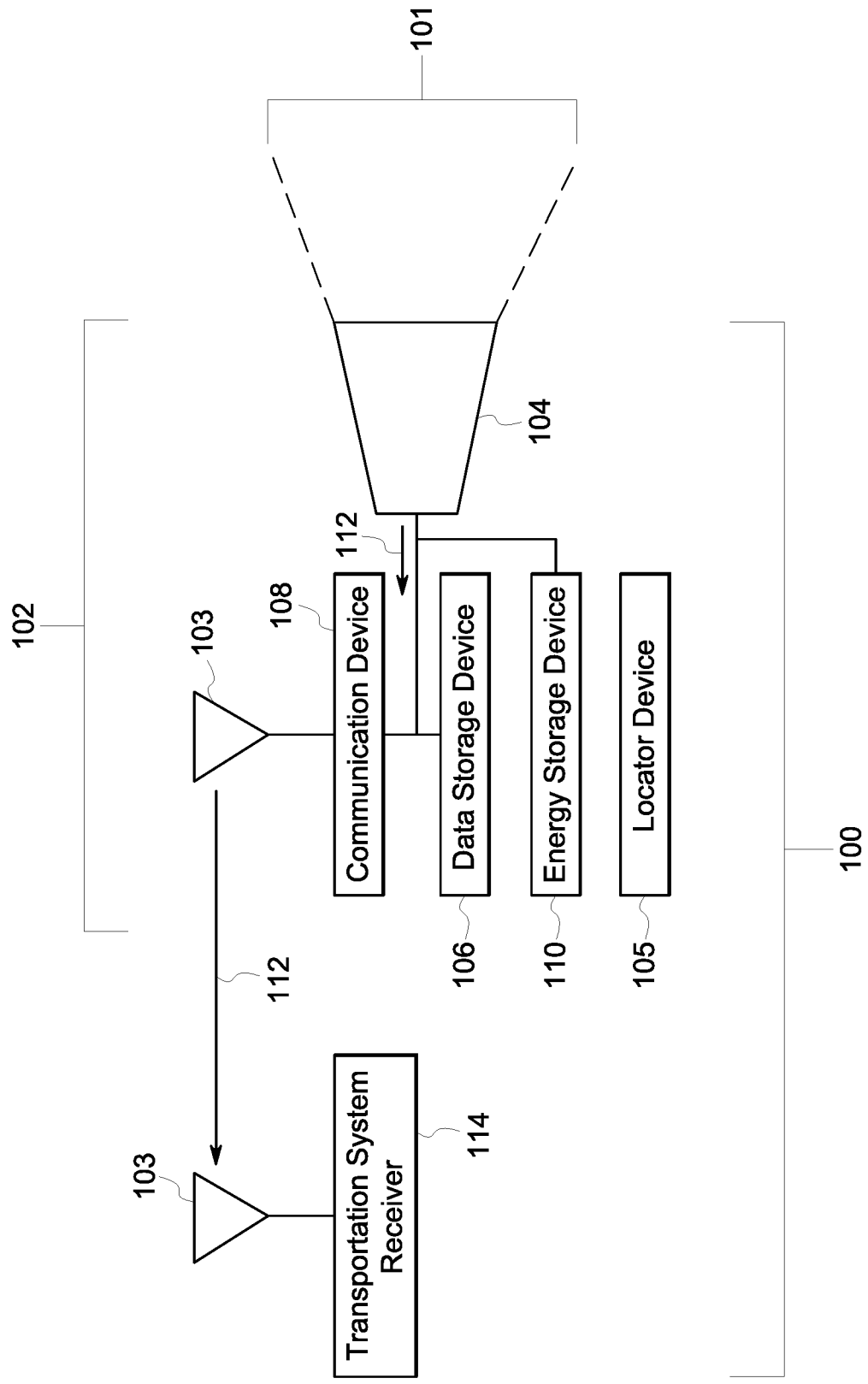
FIG. 1 illustrates a camera system for capturing and communicating transportation data related to vehicles or otherwise to a transportation system according to one embodiment.

Embodiments described herein relate to video units for capturing and communicating video data in a transportation system or network. For example, a camera may be deployed onboard a rail vehicle or other vehicle, and then carried by an operator of the vehicle (e.g., when performing work on the vehicle, inspecting the vehicle or the environs of the vehicle, or the like) to capture video data of the vehicle or its environs, for storage for later use, or for displaying or other use on board the vehicle. Optionally, the camera may be coupleable to a powered camera supporting object, such that the camera may be mobile. That is, the camera and its supporting object may capable of moving independent or separate from movement of the operator or its base vehicle. For example, the camera may be connected or otherwise disposed onboard an aerial device (e.g., a drone, helicopter, or airplane) to allow the camera unit to fly, the camera unit may be connected with or otherwise disposed onboard another ground or aquatic mobile system (e.g., a robot or remote control vehicle) to allow the robot and camera to move relative to the vehicle, or the like. In one embodiment, the camera supporting object is a first ground vehicle capable of at least one of remote control or autonomous movement relative to a second ground vehicle along a route for the second vehicle. The first ground vehicle is intended to travel along the route ahead of the second vehicle and to transmit the image data back to the second ground vehicle. This may provide an operator of the second vehicle a view of the route well in advance of the arrival of the second vehicle. For very high speed second vehicles, the stopping distance may be beyond the visibility provided from the vantage of the second vehicle. The view from the first vehicle, then, may extend or supplement that visible range. In addition, the camera itself may be repositionable and may have the ability to pan left, right, up and down, as well as the ability to zoom in and out.

As used herein, a camera is a device for capturing and/or recording visual images. These images may be in the form of still shots, analog video signals, or digital video signals. The signals, particularly the digital video signals, may be subject to compression/decompression algorithms, such as MPEG or HEVC, for example. A suitable camera may capture and record in a determined band of wavelengths of light or energy. For example, in one embodiment the camera may sense wavelengths in the visible spectrum and in another the camera may sense wavelengths in the infrared spectrum. Multiple sensors may be combined in a single camera and may be used selectively based on the application. Further, stereoscopic and 3D cameras are contemplated for at least some embodiments described herein. These cameras may assist in determining distance, velocity, and vectors to predict (and thereby avoid) collision and damage. The term consist, or vehicle consist, refers to two or more vehicles or items of mobile equipment that are mechanically or logically coupled to each other. By logically coupled, the plural items of mobile equipment are controlled so that controls to move one of the items causes a corresponding movement in the other items in consist, such as by wireless command. An Ethernet over multiple unit (eMU) system may include, for example, a communication system for use transmitting data from one vehicle to another in consist (e.g., an Ethernet network over which data is communicated between two or more vehicles).

FIG. 1 illustrates a camera system 100 for capturing and communicating transportation data related to vehicles or otherwise to a transportation system according to one embodiment. The system includes a portable camera unit 102 having a camera 104, a data storage device 106 and/or a communication device 108, and a battery or other energy storage device 110. The camera unit may be portable in that the camera unit is small and/or light enough to be carried by a single adult human. The camera unit is configured to capture and/or generate image data 112 of a field of view 101 of the camera unit. For example, the field of view may represent the solid angle through which the camera unit is sensitive to light, electromagnetic radiation, or other energy that is used to form images, videos, or the like. The image data can include still images, videos (e.g., moving images or a series of images representative of a moving object), or the like, of one or more objects within the field of view of the camera unit. In any of the embodiments of any of the camera systems described herein, data other than image data may be captured and communicated, e.g., the portable camera unit may have a microphone for capturing audio data, a vibration sensor for capturing vibration data, and so on.

A suitable portable camera unit may be an Internet protocol camera unit, such as a camera that can send video data via the Internet or another network. In one aspect, the camera can be a digital camera capable of obtaining relatively high quality image data (e.g., static or still images and/or videos). For example, the camera may be Internet protocol (IP) cameras that generate packetized image data. The camera can be a high definition (HD) camera capable of obtaining image data at relatively high resolutions. For example, the camera may obtain image data having at least 480 horizontal scan lines, at least 576 horizontal scan lines, at least 720 horizontal scan lines, at least 1080 horizontal scan lines, or an even greater resolution. Alternatively, the camera may be another type of camera.

The data storage device may be electrically connected to the camera unit and configured to store the image data. The data storage device may include one or more computer hard disk drives, removable drives, magnetic drives, read only memories, random access memories, flash drives or other solid state storage devices, or the like. Optionally, the data storage device may be disposed remote from the camera unit, such as by being separated from the camera unit by at least several centimeters, meters, kilometers, as determined at least in part by the application at hand.

The communication device may be electrically connected to the camera unit and configured to wirelessly communicate (e.g., transmit, broadcast, or the like) the image data to a transportation system receiver 114 located off-board the camera unit. Optionally, the image data may be communicated to the receiver via one or more wired connections, over power lines, through other data storage devices, or the like. The communication device and/or receiver can represent hardware circuits or circuitry, such as transceiving circuitry and associated hardware (e.g., antennas) 103, that include and/or are connected with one or more processors (e.g., microprocessors, controllers, or the like).

The energy storage device may be electrically connected to the camera unit, the data storage device, and/or the communication device. The energy storage device can represent one or more devices that store and/or generate electric current to power the camera unit, the data storage device, and/or the communication device. For example, the energy storage device can include one or more batteries, pantographs (e.g., that receive current from an off-board source via a catenary or overhead line), conductive shoes (e.g., that contact a conductive body, such as an electrified rail, to receive current from an off-board source), generators, alternators, or the like.

In one embodiment, the camera unit comprises the camera, the data storage device, and the energy storage device, but not the communication device. In such an embodiment, the camera unit may be used for storing captured image data for later retrieval and use. In another embodiment, the camera unit comprises the camera, the communication device, and the energy storage device, but not the data storage device. In such an embodiment, the portable camera unit may be used to communicate the image data to a vehicle or other location for immediate use (e.g., being displayed on a display screen), and/or for storage remote from the portable camera unit (this is, for storage not within the portable camera unit). In another embodiment, the camera unit comprises the camera, the communication device, the data storage device, and the energy storage device. In such an embodiment, the portable camera unit may have multiple modes of operation, such as a first mode of operation where image data is stored within the portable camera unit on the data storage device 106, and a second mode of operation where the image data is transmitted off the portable camera unit for remote storage and/or immediate use elsewhere.

The camera may be a digital video camera, such as a camera having a lens, an electronic sensor for converting light that passes through the lens into electronic signals, and a controller for converting the electronic signals output by the electronic sensor into the image data, which may be formatted according to a standard such as MP4. The data storage device, if present, may be a hard disc drive, flash memory (electronic non-volatile non-transitory computer storage medium), or the like. The communication device, if present, may be a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that is configured to wirelessly communicate at frequencies used for vehicle communications (e.g., at a frequency compatible with a wireless receiver of a distributed power system of a rail vehicle; distributed power refers to coordinated traction control, such as throttle and braking, of a train or other rail vehicle consist having plural locomotives or other powered rail vehicle units). A suitable energy storage device may be a rechargeable lithium-ion battery, a rechargeable Ni-Mh battery, an alkaline cell, or other device configured for portable energy storage for use in an electronic device. Another suitable energy storage device, albeit more of an energy provider than storage, include a vibration harvester and a solar panel, where energy is generated and then provided to the camera system.

The camera unit can include a locator device 105 that generates data used to determine the location of the camera unit. The locator device 105 can represent one or more hardware circuits or circuitry that include and/or are connected with one or more processors (e.g., controllers, microprocessors, or other electronic logic-based devices). In one example, the locator device 105 represents a global positioning system (GPS) receiver that determines a location of the camera unit, a beacon or other communication device that broadcasts or transmits a signal that is received by another component (e.g., the transportation system receiver) to determine how far the camera unit is from the component that receives the signal (e.g., the receiver), a radio frequency identification (RFID) tag or reader that emits and/or receives electromagnetic radiation to determine how far the camera unit is from another RFID reader or tag (e.g., the receiver), or the like. The receiver can receive signals from the locator device 105 to determine the location of the locator device 105 relative to the receiver and/or another location (e.g., relative to a vehicle or vehicle system). Additionally or alternatively, the locator device 105 can receive signals from the receiver (e.g., which may include a transceiver capable of transmitting and/or broadcasting signals) to determine the location of the locator device 105 relative to the receiver and/or another location (e.g., relative to a vehicle or vehicle system).

Figure 2:
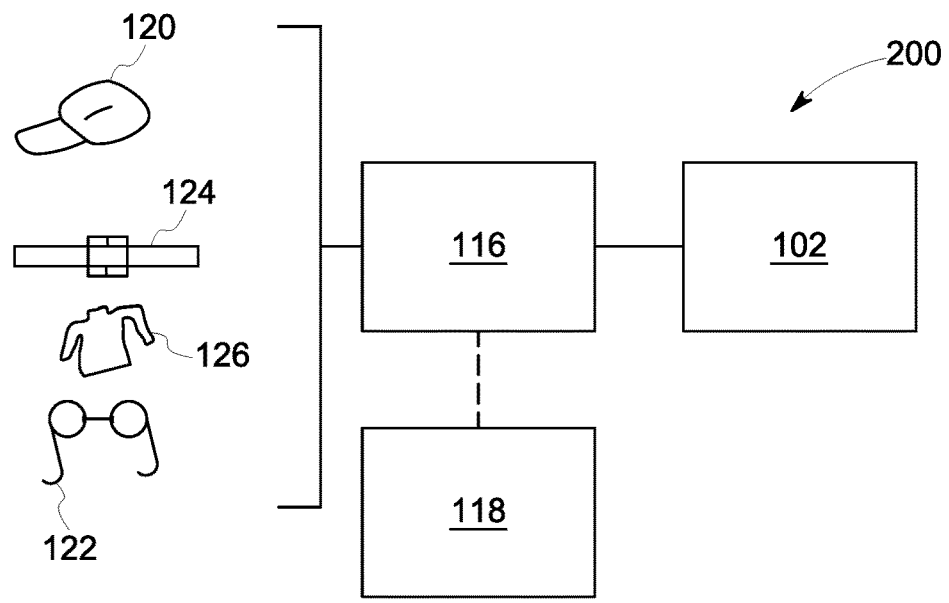
FIG. 2 illustrates a camera system according to another embodiment.

FIG. 2 illustrates a camera system 200 according to another embodiment. The system 200 includes a garment 116 configured to be worn or carried by an operator 118, such as a vehicle operator, transportation worker, or other person. The portable camera unit can be attached to the garment. For example, the garment may be a hat 120 (including a garment worn about the head), an ocular device 122 (e.g., a Google Glass™ device or other eyepiece), a belt or watch 124, part of a jacket 126 or other outer clothing, a clipboard, or the like. The camera unit may detachably connected to the garment, or, in other embodiments, the portable camera unit may be integrated into, or otherwise permanently connected to the garment. Attaching the portable camera unit to the garment can allow the portable camera unit to be worn by a human operator of a vehicle (or the human operator may be otherwise associated with a transportation system), for capturing image data associated with the human operator performing one or more functions with respect to the vehicle or transportation system more generally.

For example, in one embodiment, the portable camera unit includes the communication device, which can be configured to wirelessly communicate the image data to the transportation system receiver. The transportation system receiver can be located onboard a vehicle 128 (shown in FIG. 3), at a wayside location 130 of a route of the vehicle 128 (shown in FIG. 4) or otherwise remote from the vehicle 128 (as shown in FIG. 5). Remote generally refers to not onboard the vehicle, and in embodiments, more specifically, to not within the immediate vicinity of the vehicle, such as not within a WiFi and/or cellular range of the vehicle. In one aspect, the camera unit can be fixed to the garment being worn by an operator of the vehicle 128 and provide image data representative of areas around the operator. For example, the image data may represent the areas being viewed by the operator. The image data may no longer be generated by the camera unit during time periods that the operator is within the vehicle 128 or within a designated distance from the vehicle 128. Upon exiting the vehicle 128 or moving farther than the designated distance (e.g., five meters) from the vehicle 128, the camera unit may begin automatically generating and/or storing the image data. As described herein, the image data may be communicated to a display onboard the vehicle 128 or in another location so that another operator onboard the vehicle 128 can determine the location of the operator with the camera unit based on the image data. With respect to rail vehicles, one such instance could be an operator exiting the cab of a locomotive. If the operator is going to switch out cars from a rail vehicle that includes the locomotive, the image data obtained by the camera unit on the garment worn by the operator can be recorded and displayed to an engineer onboard the locomotive. The engineer can view the image data as a double check to ensure that the locomotive is not moved if the conductor is between cars of the rail vehicle. Once it is clear from the image data that the conductor is not in the way, then the engineer may control the locomotive to move the rail vehicle.

Optionally, the image data may be autonomously examined by one or more image data analysis systems or image analysis systems described herein. For example, one or more of the transportation receiver system 114, a vehicle, and/or the camera unit may include an image data analysis system (also referred to as an image analysis system) that examines the image data for one or more purposes described herein.

Figure 3:
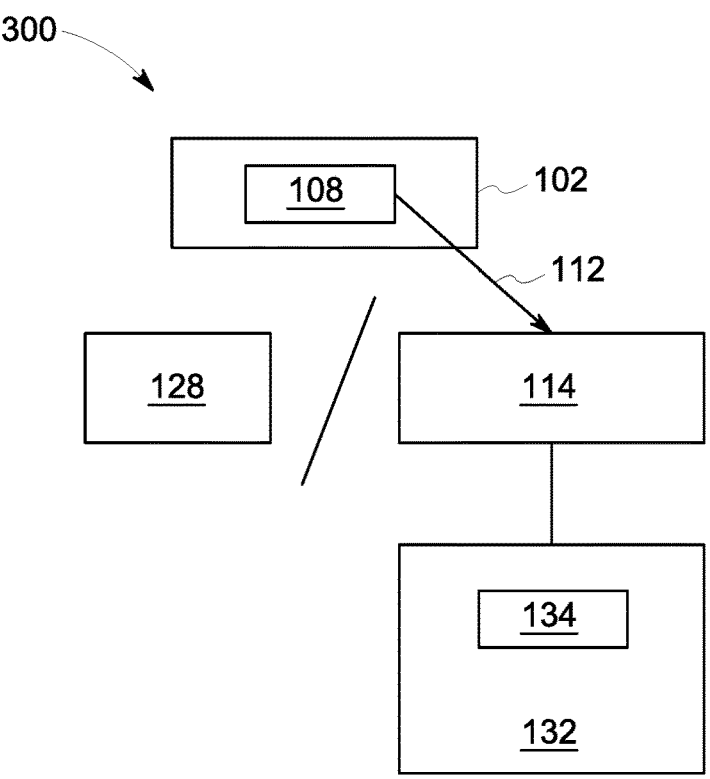
FIG. 3 illustrates another embodiment of a camera system.

FIG. 3 illustrates another embodiment of a camera system 300. The system can include a display screen system 132 located remote from the portable camera unit and the vehicle. The display screen system receives the image data from the transportation system receiver as a live feed and display the image data (e.g., converted back into moving images) on a display screen 134 of the display screen system. The live feed can include image data representative of objects contemporaneous with capturing the video data but for communication lags associated with communicating the image data from the portable camera unit to the display screen system. Such an embodiment may be used, for example, for communicating image data, captured by a human operator wearing or otherwise using the portable camera unit and associated with the human operator carrying out one or more tasks associated with a vehicle (e.g., vehicle inspection) or otherwise associated with a transportation network (e.g., rail track inspection), to a remote human operator viewing the display screen. The remote human operator, for example, may be an expert in the particular task or tasks, and may provide advice or instructions to the on-scene human operator based on the image data.

Figure 4:
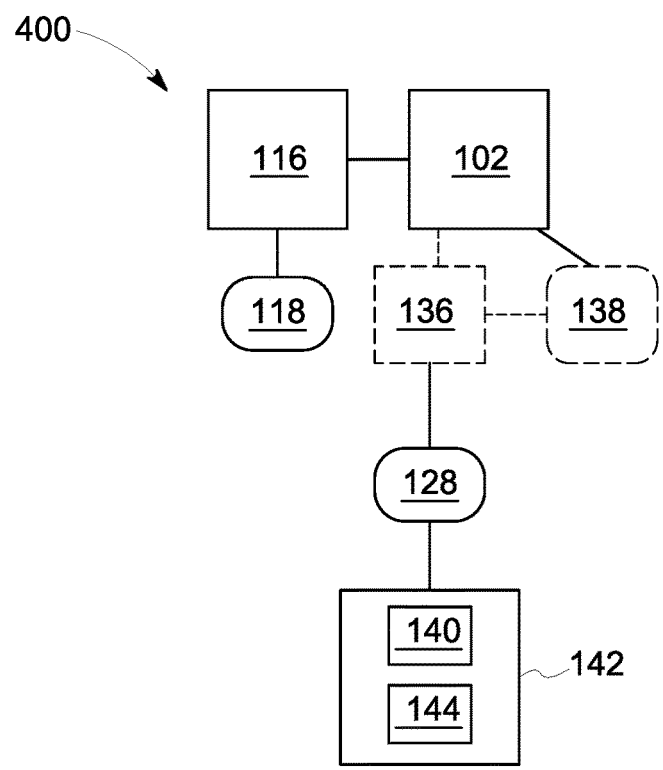
FIG. 4 illustrates another embodiment of a camera system having a garment and a portable camera unit attached and/or attachable to the garment.
Figure 5:
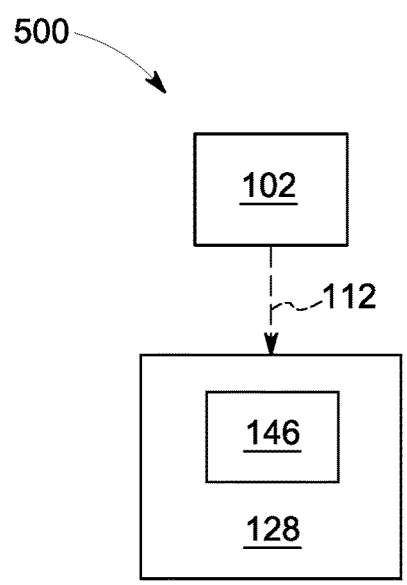
FIG. 5 illustrates another embodiment of a camera system.

FIG. 4 illustrates another embodiment of a camera system 400 having a garment and a portable camera unit attached and/or attachable to the garment. The system can be similar to the other camera systems described herein, with the system further including a position detection unit 136 and a control unit 138. The position detection unit detects a position of the transportation worker wearing the garment. The position detection unit may be connected to and part of the garment, connected to and part of the portable camera unit, or connected to and part of the vehicle or a wayside device. The position detection unit may be, for example, a global positioning system (GPS) unit, or a switch or other sensor that detects when the human operator (wearing the garment) is at a particular location in a vehicle or otherwise. In one embodiment, the position detection unit can detect the presence of a wireless signal when the camera unit is within a designated range of the vehicle or vehicle cab. The position detection unit can determine that the camera unit is no longer in the vehicle or vehicle cab responsive to the wireless signal no longer being detected or a strength of the signal dropping below a designated threshold.

The control unit (which may be part of the portable camera unit) controls the portable camera unit based at least in part on the position of the transportation worker that is detected by the position detection unit. The control unit can represent hardware circuits or circuitry that include and/or are connected with one or more processors (e.g., microprocessors, controllers, or the like).

In one embodiment, the control unit controls the portable camera unit to a first mode of operation when the position of the transportation worker that is detected by the position detection unit indicates the transportation worker is at an operator terminal 140 of the vehicle (e.g., in a cab 142 of the vehicle), and to control the portable camera unit to a different, second mode of operation when the position of the transportation worker that is detected by the position detection unit indicates the transportation worker is not at the operator terminal of the vehicle. In the first mode of operation, for example, the portable camera unit is disabled from at least one of capturing, storing, and/or communicating the image data, and in the second mode of operation, the portable camera unit is enabled to capture, store, and/or communicate the image data. In such an embodiment, therefore, it may be the case that the portable unit is disabled from capturing image data when the operator is located at the operator terminal, and enabled when the operator leaves the operator terminal. The control unit can cause the camera to record the image data when the operator leaves the operator cab or operator terminal so that actions of the operator may be tracked. For example, in the context of a rail vehicle, the movements of the operator may be examined using the image data to determine if the operator is working on the correct parts of the vehicle, at the times that the operator is to be working, or the like. As another example, in the context of police or other law enforcement personnel, the control unit can cause the camera to record images and/or videos responsive to the operator leaving the operator cab of the vehicle (e.g., a police officer leaving a police car) to generate additional evidence of an incident (e.g., an altercation with a suspect, questioning of a driver following a car accident, performance of a field sobriety test, or the like).

In another embodiment, the control unit is configured to control the portable camera unit to a first mode of operation when the position of the transportation worker that is detected by the position detection unit 136 indicates the transportation worker is in an operator cab 142 of the vehicle and to control the portable camera unit to a different, second mode of operation when the position of the transportation worker that is detected by the position detection unit indicates the transportation worker is not in the operator cab of the vehicle. For example, the portable camera unit may be enabled for capturing image data when the operator is within the operator cab, and disabled for capturing image data when the operator is outside the operator cab. As should be appreciated, enabled can include being powered on, and disabled can include being powered off.

In another embodiment, the system has a display screen 144 in the operator cab of the rail vehicle. The communication device of the portable camera unit can wirelessly transmit the image data to the transportation system receiver which may be located onboard the vehicle and operably connected to the display screen, for the image data to be displayed on the display screen. Such an embodiment may be used for one operator of a vehicle to view the image data captured by another operator of the vehicle using the portable camera unit. For example, if the portable camera system is attached to a garment worn by the one operator when performing a task external to the vehicle, video data associated with the task may be transmitted back to the other operator remaining in the operator cab, for supervision or safety purposes.

FIG. 5 illustrates another embodiment of a camera system 500. A control system 146 onboard the vehicle may be provided for controlling movement of the vehicle. The control system can include or represent the control unit, and can include hardware circuits or circuitry that include and/or are connected with one or more processors (e.g., microprocessors, controllers, or the like). The control system can control operations of the vehicle, such as by communicating command signals to a propulsion system of the vehicle (e.g., motors, engines, brakes, or the like) for controlling output of the propulsion system.

The control system can prevent movement of the vehicle responsive to a first data content of the image data and allow movement of the vehicle responsive to a different, second data content of the image data. For example, the control system onboard the vehicle may engage brakes and/or prevent motors from moving the vehicle to prevent movement of the vehicle responsive to the first data content of the image data indicating that the portable camera unit (e.g., worn by an operator, or otherwise carried by an operator) is located outside the operator cab of the vehicle and to allow movement of the vehicle responsive to the second data content of the image data indicating that the portable camera unit is located inside the operator cab.

The data content of the image data can indicate that the camera unit is outside of the operator cab based on a change in one or more parameters of the image data. One of these parameters can include brightness or intensity of light in the image data. For example, during daylight hours, an increase in brightness or light intensity in the image data can indicate that the operator and the camera unit has moved from inside the cab to outside the cab. A decrease in brightness or light intensity in the image data can indicate that the operator and the camera unit has moved from outside the cab to inside the cab. Another parameter of the image data can include the presence or absence of one or more objects in the image data. For example, the control system can use one or more image and/or video processing algorithms, such as edge detection, pixel metrics, comparisons to benchmark images, object detection, gradient determination, or the like, to identify the presence or absence of one or more objects in the image data. If the object is inside the cab or vehicle, then the inability of the control system to detect the object in the image data can indicate that the operator is no longer in the cab or vehicle. But, if the object is detected in the image data, then the control system can determine that the operator is in the cab or vehicle.

Figure 6:
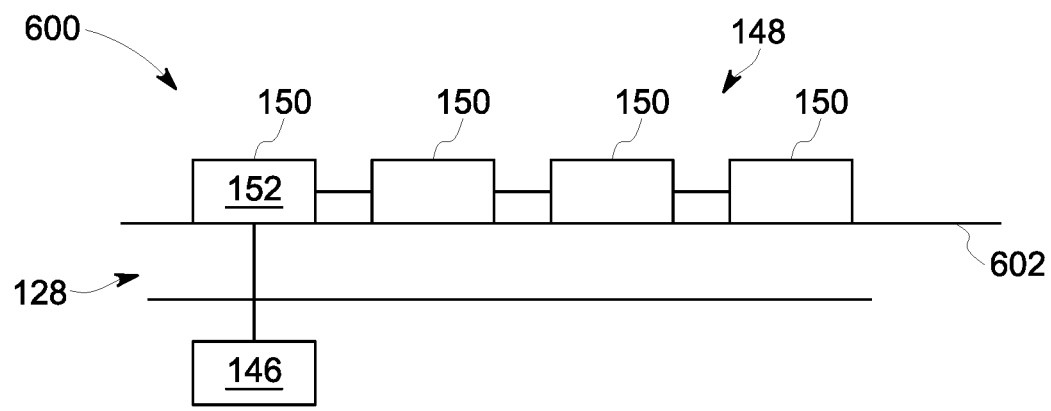
FIG. 6 illustrates one embodiment of the vehicle.

FIG. 6 illustrates one embodiment of the vehicle. The vehicle can include one or more vehicle consists 148 having plural interconnected vehicle units 150, with at least one of the plural vehicle units being a propulsion-generating vehicle unit 152. The vehicle can represent a rail vehicle system, such as a train, with the vehicle units 150, 152 representing locomotives, rail cars, or other types of rail vehicles. Alternatively, the vehicle can represent another type of vehicle, such as an automobile, marine vessel, mining vehicle, other off-highway vehicle (e.g., a vehicle that is not designed for and/or legally permitted to travel on public roadways). The consist can represent plural vehicle units mechanically connected to travel together along a route 602, such as a track, road, waterway, or the like. Alternatively, the consist and/or vehicle can include plural vehicle units that communicate with each other to travel together along the route 902, but that are not connected with each other. For example, the vehicle unit may send command signals to the vehicle units to instruct the vehicle units how to move along the route 902 to maintain separation distances between the vehicle units.

The control system onboard the vehicle can be configured to prevent movement of the vehicle consist responsive to the first data content of the image data indicating that the portable camera unit is positioned between adjacent vehicle units of the vehicle consist and to allow movement of the vehicle consist responsive to the second data content of the image data indicating that the portable camera unit is not positioned between adjacent vehicle units of the vehicle consist. Adjacent may refer to connected vehicle units that are next to one another, or to vehicle units that are not connected to one another but are next to one another. Such an embodiment may be used, for example, for preventing a consist from moving when an operator, wearing or otherwise carrying the portable camera unit, is positioned between adjacent vehicle units (e.g., for detaching or attaching the units to one another), for safety purposes.

As described above, the control system can examine parameters of the image data to determine a location of the operator. For example, a decrease in brightness may indicate that the operator and camera unit are between vehicles, while an increase or a decrease in brightness that is relatively small (e.g., no greater than a designated, non-zero threshold) may indicate that the operator and camera unit are not between vehicles.

Figure 7:
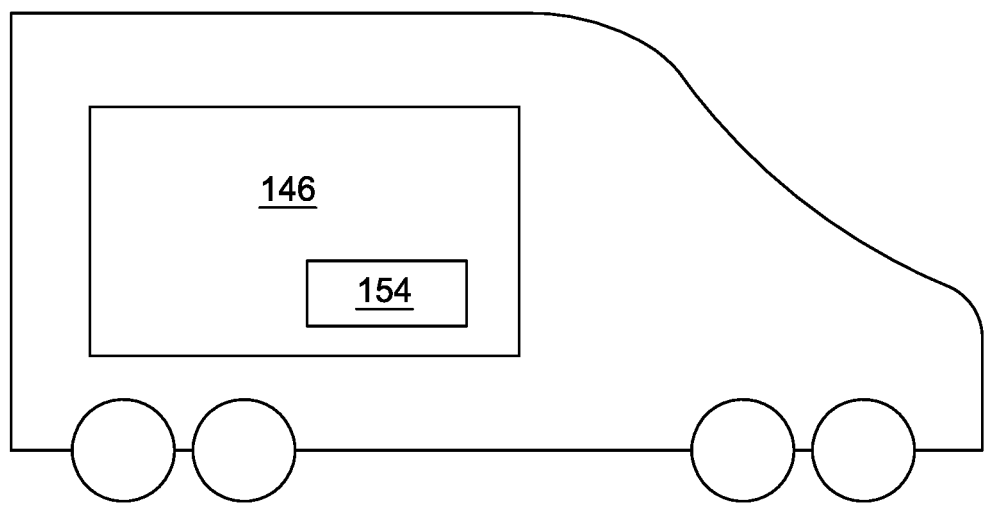
FIG. 7 illustrates a control system according to one embodiment.

FIG. 7 illustrates the control system according to one embodiment. The control system can be disposed onboard the vehicle and also can include an image data analysis system 154. The analysis system can automatically process the image data for identifying the first data content and the second data content in the image data. The control system can be is configured to automatically prevent and allow movement of the vehicle responsive to the first data and the second data, respectively, that is identified by the image data analysis system. The image data analysis system can include one or more image analysis processors that autonomously examine the image data obtained by the camera unit for one or more purposes, as described herein.

Figure 8:
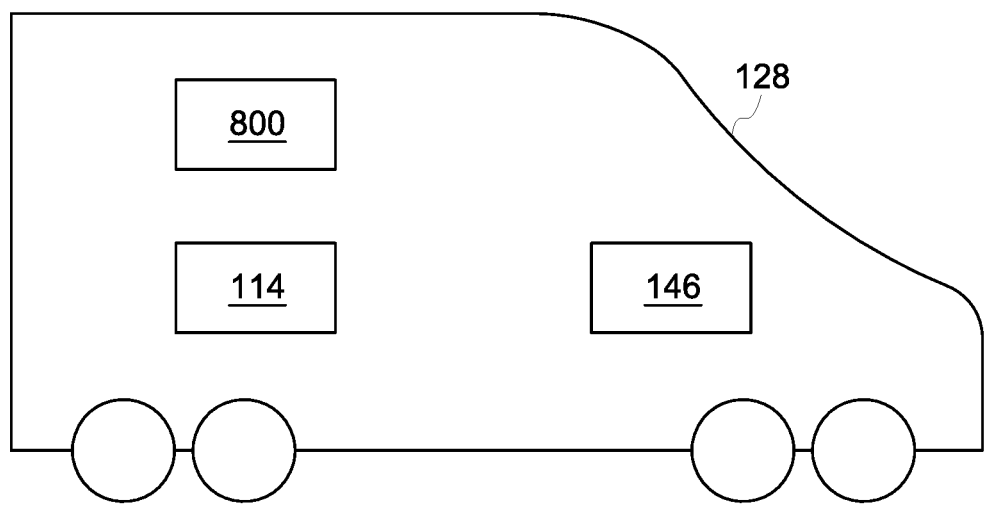
FIG. 8 illustrates a transportation system receiver located onboard the vehicle according to one embodiment.

FIG. 8 illustrates the transportation system receiver located onboard the vehicle according to one embodiment. The transportation system receiver can be configured to wirelessly communicate network data onboard and/or off-board the vehicle, and/or to automatically switch to a mode for receiving the image data from the portable camera unit responsive to the portable camera unit being active to communicate the image data. For example, responsive to the portable camera unit being active to transmit the image data, the transportation system receiver may be configured to automatically switch from a network wireless client mode of operation 156 (transmitting data originating from a device onboard the vehicle, such as the control unit) to the mode for receiving the image data from the portable camera unit. The mode for receiving the image data from the portable camera unit may comprise a wireless access point mode of operation 158 (receiving data from the portable camera unit).

In another embodiment, the camera system further comprises the transportation system receiver located onboard the vehicle. The transportation system receiver can be configured to wirelessly communicate network data onboard and/or off-board the vehicle, and/or to automatically switch from a network wireless client mode of operation to a wireless access point mode of operation, for receiving the image data from the portable camera unit. This network data can include data other than image data. For example, the network data can include information about an upcoming trip of the vehicle (e.g., a schedule, grades of a route, curvature of a route, speed limits, areas under maintenance or repair, etc.), cargo being carried by the vehicle, or other information. Alternatively, the network data can include the image data. The receiver can switch modes of operation and receive the image data responsive to at least one designated condition of the portable camera unit. For example, the designated condition may be the potable camera unit being operative to transmit the image data, or the portable camera unit being in a designated location. As another example, the designated condition may be movement or the lack of movement of the camera unit. Responsive to the receiver and/or camera unit determining that the camera unit has not moved and/or has not moved into or out of the vehicle, the camera unit may stop generating the image data, the camera unit may stop communicating the image data to the receiver, and/or the receiver may stop receiving the image data from the camera unit. Responsive to the receiver and/or camera unit determining that the camera unit is moving and/or has moved into or out of the vehicle, the camera unit may begin generating the image data, the camera unit may begin communicating the image data to the receiver, and/or the receiver may begin receiving the image data from the camera unit.

In another embodiment of one or more of the camera systems described herein, the system is configured for the image data to be stored and/or used locally (e.g., in the vehicle), or to be transmitted to a remote location (e.g., off-vehicle location) based on where the vehicle is located. For example, if the vehicle is in a yard (e.g., a switching yard, maintenance facility, or the like), the image data may be transmitted to a location in the yard. But, prior to the vehicle entering the yard or a designated location in the yard, the image data may be stored onboard the vehicle and not communicated to any location off of the vehicle.

Thus, in an embodiment, the system further comprises a control unit that, responsive to at least one of a location of the portable camera unit or a control input, controls at least one of the portable camera unit or the transportation system receiver to a first mode of operation for at least one of storing or displaying the video data on board the rail vehicle and to a second mode of operation for communicating the video data off board the rail vehicle for at least one of storage or display of the video data off board the rail vehicle. For example, the control unit may be configured to automatically control said at least one of the portable camera unit or the transportation system receiver from the first mode of operation to the second mode of operation responsive to the location of the portable camera unit being indicative of the rail vehicle being in a yard.

During operation of the vehicle and/or camera unit outside of a designated area (e.g., a geofence extending around a vehicle yard or other location), the image data generated by the camera may be locally stored in the data storage device of the camera unit, shown on a display of the vehicle, or the like. Responsive to the vehicle and/or camera unit entering into the designated area, the camera unit can switch modes to begin wirelessly communicating the image data to the receiver, which may be located in the designated area. Changing where the image data is communicated based on the location of the vehicle and/or camera unit can allow for the image data to be accessible to those operators viewing the image data for safety, analysis, or the like. For example, during movement of the vehicle outside of the vehicle yard, the image data can be presented to an onboard operator, and/or the image data may be analyzed by an onboard analysis system of the vehicle to ensure safe operation of the vehicle. Responsive to the vehicle and/or camera unit entering into the vehicle yard, the image data can be communicated to a central office or management facility for remote monitoring of the vehicle and/or operations being performed near the vehicle.

As one example, event data transmission (e.g., the transmitting, broadcasting, or other communication of image data) may be configured to occur based on various vehicle conditions, geographic locations, and/or situations. The image data may be either pulled (e.g., requested) or pushed (e.g., transmitted and/or broadcast) from the vehicle. For example, image data can be sent from a vehicle to an off-board location based on selected operating conditions (e.g., emergency brake application), a geographic location (e.g., in the vicinity of a crossing between two or more routes), selected and/or derived operating areas of concern (e.g., high wheel slip or vehicle speed exceeding area limits), and/or time driven messages (e.g., sent once a day). The off-board location may also request and retrieve the image data from specific vehicles on demand.

Figure 9:
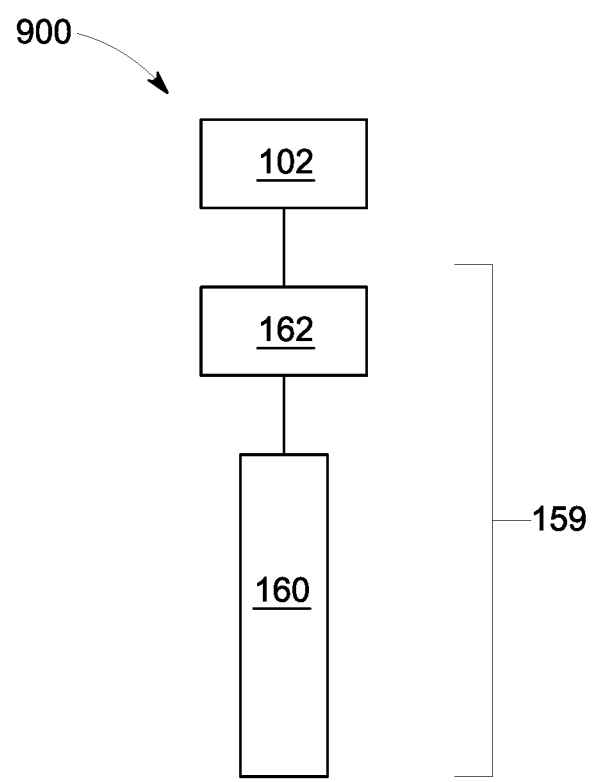
FIG. 9 illustrates another embodiment of a camera system.

FIG. 9 illustrates another embodiment of a camera system 900. The system includes a portable support 159 having at least one leg 160 and a head 162 attached to the at least one leg. The head detachably couples to the portable camera unit, and the at least one leg autonomously supports (e.g., without human interaction) the portable camera unit at a wayside location off-board the vehicle. The support can be used to place the camera unit in a position to view at least one of the vehicle and/or the wayside location. The communication device can wirelessly communicate the image data to the transportation system receiver that is located onboard the vehicle. The image data can be communicated from off-board the vehicle to onboard the vehicle for at least one of storage and/or display of the image data onboard the vehicle. In one example, the portable support may be a camera tripod. The portable support may be used by an operator to set up the portable camera unit external to the vehicle, for transmitting the image data back to the vehicle for viewing in an operator cab of the vehicle or in another location. The image data can be communicated to onboard the vehicle to allow the operator and/or another passenger of the vehicle to examine the exterior of the vehicle, to examine the wayside device and/or location, to examine the route on which the vehicle is traveling, or the like. In one example, the image data may be communicated onboard the vehicle from an off-board location to permit the operator and/or passengers to view the image data for entertainment purposes, such as to view films, videos, or the like.

Figure 10:
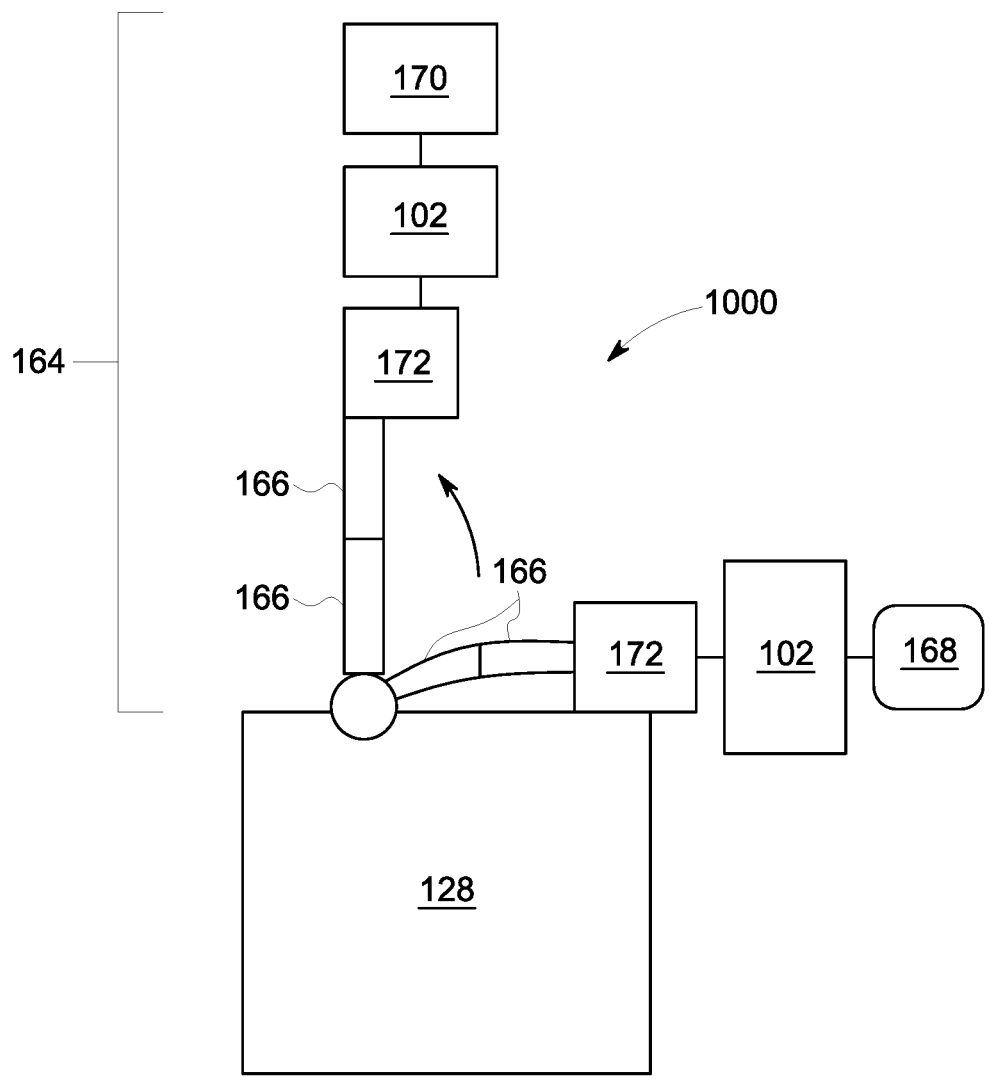
FIG. 10 illustrates another embodiment of a camera system.

FIG. 10 illustrates another embodiment of a camera system 1000. The system includes a retractable mast 164 configured for attachment to the vehicle. The retractable mast has one or more mast segments 166 deployable from a first position 168 relative to the vehicle to a second position 170 relative to the vehicle, the second position being higher relative to the ground than the first position. The mast includes a coupler 172 attached to at least one of the mast segments. The coupler allows for detachable coupling of the portable camera unit to at least one of the mast segments. When the portable camera unit is coupled to the retractable mast by way of the coupler and the retractable mast is deployed to the second position, the portable camera unit is positioned above the vehicle, for inspecting the roof of the vehicle, other vehicle units in a consist, the environs of the vehicle, or the like.

Figure 11:
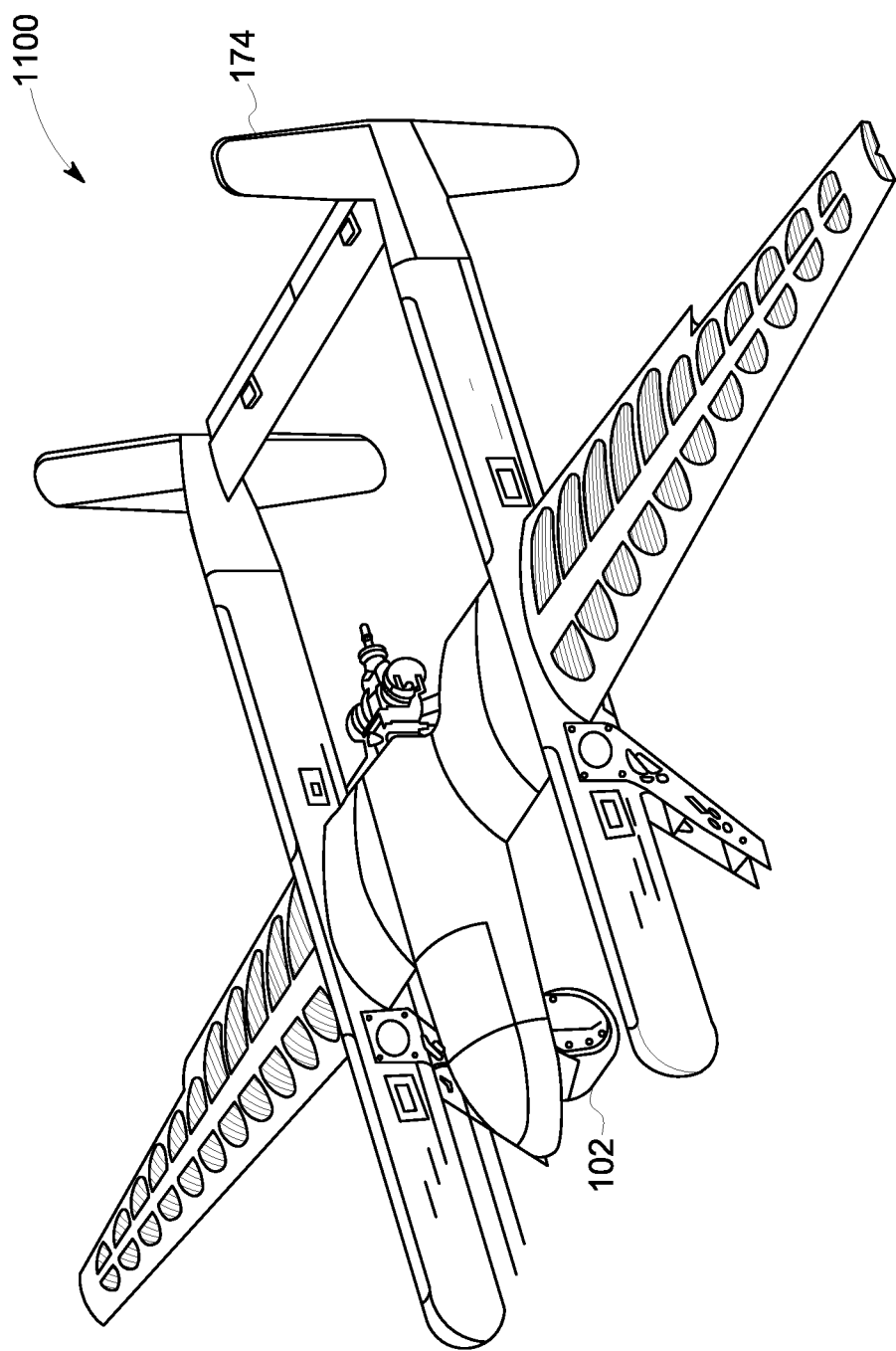
FIG. 11 illustrates a perspective view of the camera system.
Figure 12:
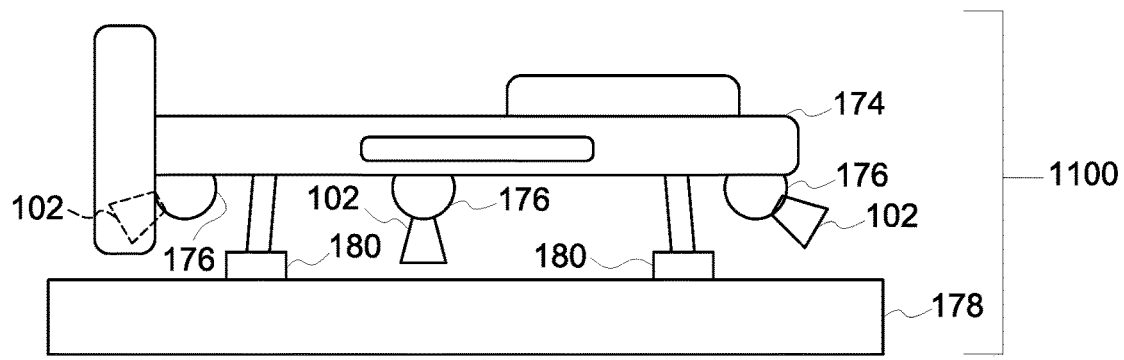
FIG. 12 illustrates a side view of the camera system shown in FIG. 11.
Figure 13:
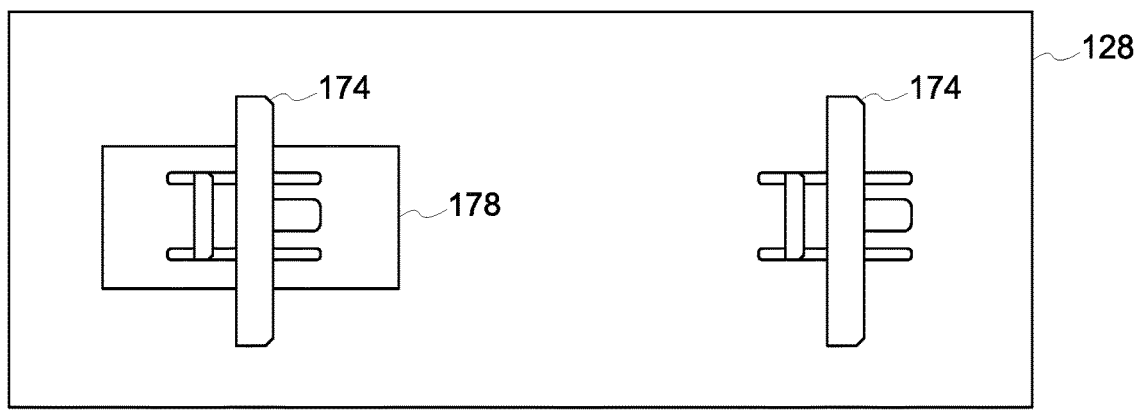
FIG. 13 illustrates a top view of the camera system shown in FIG. 11.

FIGS. 11, 12, and 13 illustrate another embodiment of a camera system 1100. FIG. 11 illustrates a perspective view of the camera system, FIG. 12 illustrates a side view of the camera system, and FIG. 13 illustrates a top view of the camera system 1100. The system includes an aerial device 174 configured for at least one of remote control or autonomous flying over a ground route of the vehicle. The aerial device may have one or more camera docks 176 for receiving one or more portable camera units, and may have also a vehicle dock for coupling the aerial device to the vehicle. In the illustrated example, the aerial device includes three cameras, with one camera unit facing along a forward direction of travel 1200 of the aerial device, another camera unit facing along a downward direction 1202 toward the ground or route over which the aerial device flies, and another camera unit facing along a rearward direction 1204 of the aerial device. Alternatively, a different number of camera units may be used and/or the camera units may be oriented in other directions.

When the aerial device is in the air, the portable camera units can be positioned for the cameras to view the route, the vehicle, or other areas near the vehicle. The aerial device may be, for example, a scale dirigible, a scale helicopter, or the like (e.g., the aerial device may be smaller than needed for transporting humans, such as ¹/₁₀ scale or smaller). A suitable scale helicopter can include quadcopters and the like.

The system also can include an aerial device vehicle dock 178 to attach the aerial device to the vehicle. The aerial device vehicle dock can receive the aerial device for at least one of detachable coupling of the aerial device to the vehicle, charging of a battery of the aerial device from a power source of the vehicle, or the like. For example, the dock can include one or more connectors 180 that mechanically or magnetically coupled with the aerial device to prevent the aerial device from moving relative to the dock, that conductively couple an onboard power source (e.g., battery) of the aerial device with a power source of the vehicle (e.g., generator, alternator, battery, pantograph, or the like) so that the power source of the aerial device can be charged by the power source of the vehicle during movement of the vehicle.

The aerial device can fly off of the vehicle to obtain image data that is communicated from one or more of the cameras onboard the aerial device to one or more receivers 114 onboard the vehicle. The aerial device can fly relative to the vehicle while the vehicle is stationary and/or while the vehicle is moving along a route. The image data may be displayed to an operator on a display device onboard the vehicle and/or may be autonomously examined as described herein. The image data can be examined by the operator and/or an image analysis system of the vehicle, such as to examine the vehicle, to examine other vehicles traveling relative to the vehicle (e.g., to avoid collisions between the vehicles), to examine the route being traveled upon (e.g., to perform route inspection), to warn of upcoming obstructions or other problems along the route ahead of the vehicle, and the like. When the aerial device is coupled into the vehicle dock, one or more cameras can be positioned to view the route during movement of the vehicle.

Figure 14:
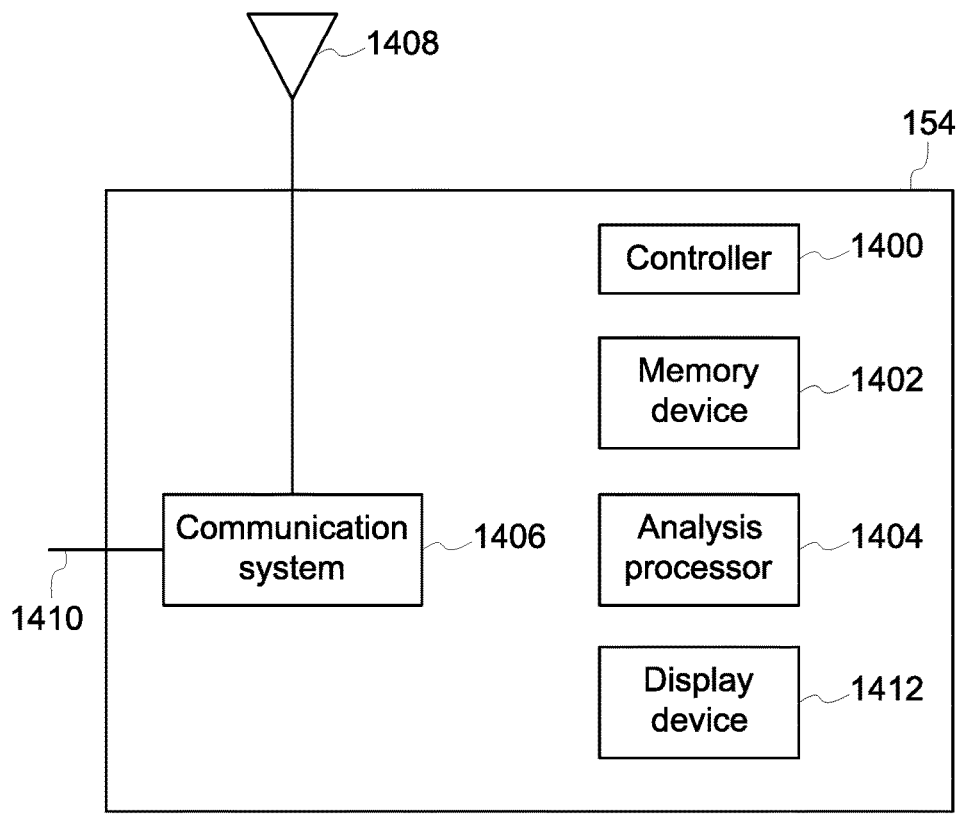
FIG. 14 is a schematic illustration of an image analysis system according to one embodiment.

FIG. 14 is a schematic illustration of the image analysis system 154 according to one embodiment. As described herein, the image analysis system can be used to examine the data content of the image data to automatically identify objects in the image data, damage in the route, or the like. A controller 1400 of the system includes or represents hardware circuits or circuitry that includes and/or is connected with one or more computer processors, such as one or more computer microprocessors. The controller can save image data obtained by the camera unit to one or more memory devices 1402 of the imaging system, generate alarm signals responsive to identifying one or more problems with the route and/or the wayside devices based on the image data that is obtained, or the like. The memory device 1402 includes one or more computer readable media used to at least temporarily store the image data. A suitable memory device can include a computer hard drive, flash or solid state drive, optical disk, or the like.

During travel of the vehicle along a route, the camera unit can generate image data representative of images and/or video of the field of view of the camera. This image data can represent actions occurring in the interior of the vehicle (e.g., the operator changing operational settings of the vehicle). For example, one use for the image data may be for an accident investigation, where the actions of an onboard operator are examined to determine if the operator was present at the controls of the vehicle at the time of the accident, if the operator was awake and aware leading up to the accident, if the proper actions were taken leading up to the accident (e.g., a horn or other alarm was activated, the brakes were engaged, etc.), and the like.

Additionally or alternatively, the image data may be used to inspect the health of the route, status of wayside devices along the route being traveled on by the vehicle, or the like. The field of view of the camera unit can encompass at least some of the route and/or wayside devices disposed ahead of the vehicle along a direction of travel of the vehicle. During movement of the vehicle along the route, the camera unit can obtain image data representative of the route and/or the wayside devices for examination to determine if the route and/or wayside devices are functioning properly, or have been damaged, need repair, and/or need further examination.

The image data created by the camera unit can be referred to as machine vision, as the image data represents what is seen by the system in the field of view of the camera unit. One or more analysis processors 1404 of the system may examine the image data to identify conditions of the vehicle, the route, and/or wayside devices. Optionally, the analysis processor can examine the terrain at, near, or surrounding the route and/or wayside devices to determine if the terrain has changed such that maintenance of the route, wayside devices, and/or terrain is needed. For example, the analysis processor can examine the image data to determine if vegetation (e.g., trees, vines, bushes, and the like) is growing over the route or a wayside device (such as a signal) such that travel over the route may be impeded and/or view of the wayside device may be obscured from an operator of the vehicle. As another example, the analysis processor can examine the image data to determine if the terrain has eroded away from, onto, or toward the route and/or wayside device such that the eroded terrain is interfering with travel over the route, is interfering with operations of the wayside device, or poses a risk of interfering with operation of the route and/or wayside device. Thus, the terrain "near" the route and/or wayside device may include the terrain that is within the field of view of the camera unit when the route and/or wayside device is within the field of view of the camera unit, the terrain that encroaches onto or is disposed beneath the route and/or wayside device, and/or the terrain that is within a designated distance from the route and/or wayside device (e.g., two meters, five meters, ten meters, or another distance). The analysis processor can represent hardware circuits and/or circuitry that include and/or are connected with one or more processors, such as one or more computer microprocessors, controllers, or the like.

Acquisition of image data from the camera unit can allow for the analysis processor 1404 to have access to sufficient information to examine individual video frames, individual still images, several video frames, or the like, and determine the condition of the wayside devices and/or terrain at or near the wayside device. The image data optionally can allow for the analysis processor to have access to sufficient information to examine individual video frames, individual still images, several video frames, or the like, and determine the condition of the route. The condition of the route can represent the health of the route, such as a state of damage to one or more rails of a track, the presence of foreign objects on the route, overgrowth of vegetation onto the route, and the like. As used herein, the term "damage" can include physical damage to the route (e.g., a break in the route, pitting of the route, or the like), movement of the route from a prior or designated location, growth of vegetation toward and/or onto the route, deterioration in the supporting material (e.g., ballast material) beneath the route, or the like. For example, the analysis processor may examine the image data to determine if one or more rails are bent, twisted, broken, or otherwise damaged. Optionally, the analysis processor can measure distances between the rails to determine if the spacing between the rails differs from a designated distance (e.g., a gauge or other measurement of the route). The analysis of the image data by the analysis processor can be performed using one or more image and/or video processing algorithms, such as edge detection, pixel metrics, comparisons to benchmark images, object detection, gradient determination, or the like.

A communication system 1406 of the system represents hardware circuits or circuitry that include and/or are connected with one or more processors (e.g., microprocessors, controllers, or the like) and communication devices (e.g., wireless antenna 1408 and/or wired connections 1410) that operate as transmitters and/or transceivers for communicating signals with one or more locations. For example the communication system may wirelessly communicate signals via the antenna and/or communicate the signals over the wired connection (e.g., a cable, bus, or wire such as a multiple unit cable, train line, or the like) to a facility and/or another vehicle system, or the like.

The image analysis system optionally may examine the image data obtained by the camera unit to identify features of interest and/or designated objects in the image data. By way of example, the features of interest can include gauge distances between two or more portions of the route. With respect to rail vehicles, the features of interest that are identified from the image data can include gauge distances between rails of the route. The designated objects can include wayside assets, such as safety equipment, signs, signals, switches, inspection equipment, or the like. The image data can be inspected automatically by the route examination systems to determine changes in the features of interest, designated objects that are missing, designated objects that are damaged or malfunctioning, and/or to determine locations of the designated objects. This automatic inspection may be performed without operator intervention. Alternatively, the automatic inspection may be performed with the aid and/or at the request of an operator.

The image analysis system can use analysis of the image data to detect damage to the route. For example, misalignment of track traveled by rail vehicles can be identified. Based on the detected misalignment, an operator of the vehicle can be alerted so that the operator can implement one or more responsive actions, such as by slowing down and/or stopping the vehicle. When the damaged section of the route is identified, one or more other responsive actions may be initiated. For example, a warning signal may be communicated (e.g., transmitted or broadcast) to one or more other vehicles to warn the other vehicles of the damage, a warning signal may be communicated to one or more wayside devices disposed at or near the route so that the wayside devices can communicate the warning signals to one or more other vehicles, a warning signal can be communicated to an off-board facility that can arrange for the repair and/or further examination of the damaged segment of the route, or the like.

In another embodiment, the image analysis system can examine the image data to identify text, signs, or the like, along the route. For example, information printed or displayed on signs, display devices, vehicles, or the like, indicating speed limits, locations, warnings, upcoming obstacles, identities of vehicles, or the like, may be autonomously read by the image analysis system. The image analysis system can identify information by the detection and reading of information on signs. In one aspect, the image analysis processor can detect information (e.g., text, images, or the like) based on intensities of pixels in the image data, based on wireframe model data generated based on the image data, or the like. The image analysis processor can identify the information and store the information in the memory device. The image analysis processor can examine the information, such as by using optical character recognition to identify the letters, numbers, symbols, or the like, that are included in the image data. This information may be used to autonomously and/or remotely control the vehicle, such as by communicating a warning signal to the control unit of a vehicle, which can slow the vehicle in response to reading a sign that indicates a speed limit that is slower than a current actual speed of the vehicle. As another example, this information may be used to identify the vehicle and/or cargo carried by the vehicle by reading the information printed or displayed on the vehicle.

In another example, the image analysis system can examine the image data to ensure that safety equipment on the route is functioning as intended or designed. For example, the image analysis processor, can analyze image data that shows crossing equipment. The image analysis processor can examine this data to determine if the crossing equipment is functioning to notify other vehicles at a crossing (e.g., an intersection between the route and another route, such as a road for automobiles) of the passage of the vehicle through the crossing.

In another example, the image analysis system can examine the image data to predict when repair or maintenance of one or more objects shown in the image data is needed. For example, a history of the image data can be inspected to determine if the object exhibits a pattern of degradation over time. Based on this pattern, a services team (e.g., a group of one or more personnel and/or equipment) can identify which portions of the object are trending toward a bad condition or already are in bad condition, and then may proactively perform repair and/or maintenance on those portions of the object. The image data from multiple different camera units acquired at different times of the same objects can be examined to determine changes in the condition of the object. The image data obtained at different times of the same object can be examined in order to filter out external factors or conditions, such as the impact of precipitation (e.g., rain, snow, ice, or the like) on the appearance of the object, from examination of the object. This can be performed by converting the image data into wireframe model data, for example.

Figure 15:
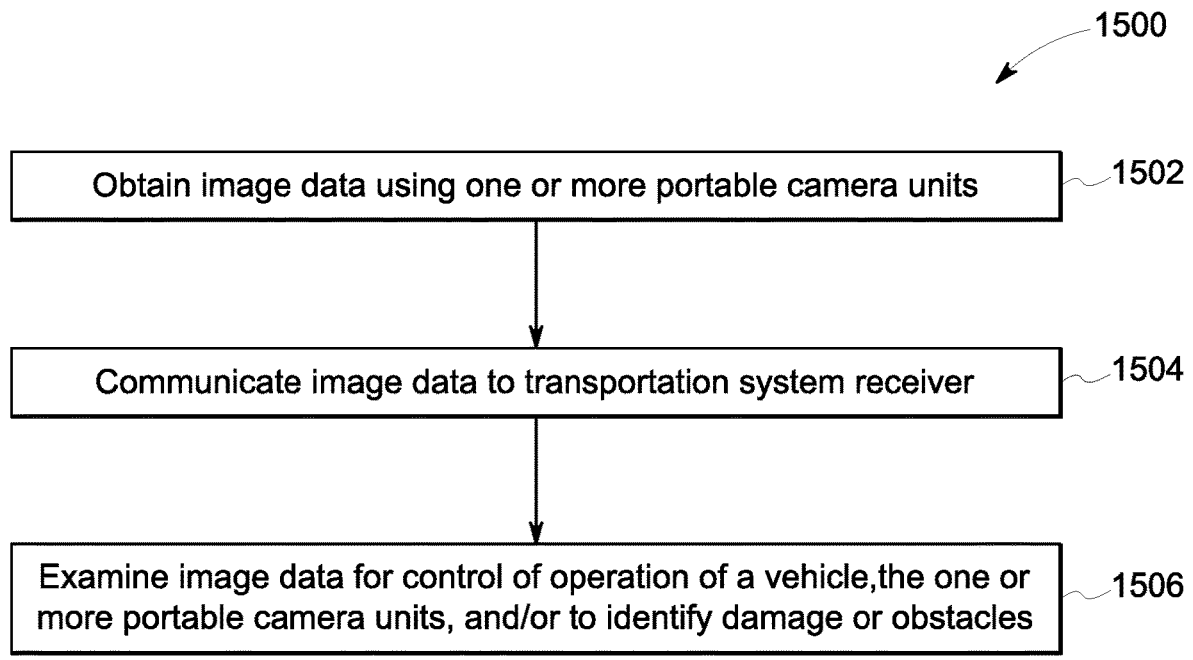
FIG. 15 illustrates a flowchart of one embodiment of a method for obtaining and/or analyzing image data for transportation data communication.

FIG. 15 illustrates a flowchart of one embodiment of a method 1500 for obtaining and/or analyzing image data for transportation data communication. The method may be practiced by one or more embodiments of the systems described herein. At 1502, image data is obtained using one or more portable camera units. As described above, the portable camera units may be coupled to a garment worn by an operator onboard and/or off-board a vehicle, may be coupled to a wayside device that is separate and disposed off-board the vehicle but that can obtain image data of the vehicle and/or areas around the vehicle, may be coupled to the vehicle, may be coupled with an aerial device for flying around and/or ahead of the vehicle, or the like. In one aspect, the camera unit may be in an operational state or mode in which image data is not being generated by the camera unit during time periods that the camera unit is inside of (or outside of) a designated area, such as a vehicle. Responsive to the camera unit moving outside of (or into) the designated area, the camera unit may change to another operational state or mode to begin generating the image data.

At 1504, the image data is communicated to the transportation system receiver. For example, the image data can be wirelessly communicated from the portable camera unit to the transportation system receiver. Optionally, the image data can be communicated using one or more wired connections. The image data can be communicated as the image data is obtained, or may be communicated responsive to the vehicle and/or the camera unit entering into or leaving a designated area, such as a geo-fence.

At 1506, the image data is examined for one or more purposes, such as to control or limit control of the vehicle, to control operation of the camera unit, to identify damage to the vehicle, the route ahead of the vehicle, or the like, and/or to identify obstacles in the way of the vehicle. For example, if the camera unit is worn on a garment of an operator that is off-board the vehicle, then the image data can be analyzed to determine whether the operator is between two or more vehicle units of the vehicle and/or is otherwise in a location where movement of the vehicle would be unsafe (e.g., the operator is behind and/or in front of the vehicle). With respect to vehicle consists, the image data can be examined to determine if the operator is between two or more vehicle units or is otherwise in a location that cannot easily be seen (and is at risk of being hurt or killed if the vehicle consist moves). Optionally, the image data can be examined to determine if the off-board operator is in a blind spot of the driver of the vehicle, such as behind the vehicle. An image analysis system described above can examine the image data and, if it is determined that the off-board operator is between vehicle units, is behind the vehicle, and/or is otherwise in a location that is unsafe if the vehicle moves, then the image analysis system can generate a warning signal that is communicated to the control unit of the vehicle. This warning signal can be received by the control unit and, responsive to receipt of this control signal, the control unit can prevent movement of the vehicle. For example, the control unit may disregard movement of controls by an onboard operator to move the vehicle, the control unit may engage brakes and/or disengage a propulsion system of the vehicle (e.g., turn off or otherwise deactivate an engine, motor, or other propulsion-generating component of the vehicle). In one aspect, the image analysis system can examine the image data to determine if the route is damaged (e.g., the rails on which a vehicle is traveling are broken, bent, or otherwise damaged), if obstacles are on the route ahead of the vehicle (e.g., another vehicle or object on the route), or the like.

In one embodiment, a system (e.g., a camera system) includes a camera, at least one of a data storage device and/or a communication device, a camera supporting object, a locator device, and a control unit. The camera can be configured to capture at least image data. The data storage device can be electrically coupled to the camera and configured to store the image data. The communication device can be electrically coupled to the camera and configured to communicate the image data to a system receiver. The camera supporting object can be coupled to the camera. The locator device can be configured to detect a location of the camera supporting object. The control unit can be configured to communicate with the system receiver and the locator device, and to control the camera based at least in part on the location of the camera supporting object.

In one aspect, the camera supporting object can be coupled to a garment configured to be worn by a worker, and the control unit can be configured to control the camera to a first mode of operation responsive to the location of the worker indicating that the worker is at an operator terminal and to control the camera to a different, second mode of operation responsive to the location of the worker indicating that the worker is not at the operator terminal.

In one aspect, in the first mode of operation, the camera can be disabled from performing at least one of capturing, storing, or communicating the image data, and, in the second mode of operation the camera can be enabled to perform at least one of capturing, storing, or communicating the image data.

In one aspect, the operator terminal can be located in an operator cab of a vehicle.

In one aspect, the system also includes a vehicle control unit configured to control a vehicle based at least in part on the image data, and to prevent movement of the vehicle responsive to a first data content of the image data indicating that the worker wearing the garment is located outside the operator cab of the vehicle and to allow movement of the vehicle responsive to a second data content of the image data indicating that the worker wearing the garment is located inside the operator cab.

In one aspect, the vehicle can be one of a plurality of vehicles that are logically or mechanically coupled to form a consist having plural interconnected vehicle units, with at least one of the plural vehicle units being a powered vehicle unit. The vehicle control unit can be configured to prevent movement of the vehicle consist responsive to a first data content of the image data indicating that the camera is positioned between adjacent vehicle units of the vehicle consist and to allow movement of the vehicle consist responsive to a second data content of the image data indicating that the camera is not positioned between adjacent vehicle units of the vehicle consist.

In one aspect, the vehicle control unit can include an image data analysis system configured to process the image data and thereby to identify the first data content and the second data content. The vehicle control unit can be configured to prevent and allow movement of the vehicle responsive to the first data and the second data, respectively, that is identified by the image data analysis system.

In one aspect, the system also can include a transportation system receiver disposed onboard a vehicle, wherein the transportation system receiver is configured to communicate network data other than the image data to at least one of onboard or off-board the vehicle and to switch to a mode for receiving the image data from the camera responsive to the camera being active to communicate the image data.

In one aspect, the transportation system receiver can be configured to wirelessly transmit the network data off-board of the vehicle.

In one aspect, the transportation system receiver can be configured to transmit one or both of the network data and the image data onboard of the vehicle through an Ethernet network that is configured for the communication of data between the vehicle and one or more other vehicles.

In one aspect, the camera supporting object can include a retractable mast.

In one aspect, the camera supporting object can include an aerial device configured for at least one of remote control or autonomous flying relative to a ground vehicle route for a vehicle.

In one aspect, the aerial device can include a vehicle dock for coupling the aerial device to the vehicle. When the aerial device is in the vehicle dock, the camera can be positioned to view the vehicle route.

In one aspect, the aerial device can include a vehicle dock for coupling the aerial device to the vehicle. The vehicle dock can be configured to charge a battery of the aerial device from a power source of the vehicle when the aerial device is docked in the vehicle dock.

In one aspect, the camera supporting object can include a first ground vehicle configured for at least one of remote control or autonomous movement relative to a second ground vehicle along a route for the second vehicle. The first ground vehicle can be intended to travel along the route ahead of the second vehicle and to transmit the image data back to the second ground vehicle.

In another embodiment, a method (e.g., for obtaining and/or communicating image data) includes obtaining image data from a camera configured to capture image data (where the camera can be supported by a camera supporting object), determining a location of the camera supporting object, and controlling the camera based at least in part on the location of the camera supporting object that is detected by the locator device.

In one aspect, the camera supporting object can include a garment configured to be worn by a worker. The method also can include switching the camera to a first mode of operation responsive to the location of the worker indicating that the worker is at an operator terminal of a vehicle and switching the camera to a different, second mode of operation responsive to the location of the worker that indicating that the worker is not at the operator terminal of the vehicle.

In one aspect, the method also can include disabling the camera from at least one of capturing, storing, or communicating the image data responsive to determining that the camera is in the first mode of operation, and enabling the camera to said at least one of capturing, storing, or communicating the image data responsive to determining that the camera is in the second mode of operation.

In one aspect, the camera supporting object can include a garment configured to be worn by a worker. The method also can include preventing movement of a vehicle responsive to first data content of the image data indicating that the worker is located outside an operator cab of a vehicle and allowing the movement of the vehicle responsive to second data content of the image data indicating that the worker is located inside the operator cab.

In one aspect, the method also can include controlling the camera supporting device to travel relative to a ground vehicle and thereby to observe via the camera one or more of a vehicle, a wayside asset, or a route being traveled upon by the ground vehicle.

In one aspect, the method also can include examining the image data to identify damage to or the condition of one or more of the vehicle, the wayside asset, or the route being traveled upon by the ground vehicle, and/or to predict imminent impact or damage to one or more of the vehicle, the wayside asset, or the route being traveled upon by the ground vehicle.

In one embodiment, a system (e.g., a camera system) includes a portable camera unit and a garment. The portable camera unit includes a camera configured to capture at least image data, at least one of a data storage device electrically connected to the camera and configured to store the image data or a communication device electrically connected to the camera and configured to wirelessly communicate the image data to a transportation system receiver located off-board the portable camera unit. The garment is configured to be worn by a transportation worker. The portable camera unit is attached to the garment.

In one aspect, the garment includes one or more of a hat or an ocular device. In one aspect, the system also can include a locator device configured to detect a location of the transportation worker wearing the garment, and a control unit configured to control the portable camera unit based at least in part on the location of the transportation worker that is detected by the locator device. In one aspect, the control unit is configured to control the portable camera unit to a first mode of operation responsive to the location of the transportation worker that is detected by the locator device indicating that the transportation worker is at an operator terminal of the vehicle and to control the portable camera unit to a different, second mode of operation responsive to the location of the transportation worker that is detected by the locator device indicating that the transportation worker is not at the operator terminal of the vehicle.

In one aspect, in the first mode of operation, the portable camera unit can be disabled from at least one of capturing, storing, or communicating the image data, and, in the second mode of operation, the portable camera unit can be enabled to one or more of capturing, storing, or communicating the image data. In one aspect, the control unit can be configured to control the portable camera unit to a first mode of operation responsive to the location of the transportation worker that is detected by the locator device indicating that the transportation worker is in an operator cab of the vehicle and to control the portable camera unit to a different, second mode of operation responsive to the location of the transportation worker that is detected by the locator device indicating that the transportation worker is not in the operator cab of the vehicle.

In one aspect, the system also can include a vehicle control unit configured to control the vehicle based at least in part on the image data. The vehicle control unit can be configured to prevent movement of the vehicle responsive to first data content of the image data indicating that the portable camera unit is located outside the operator cab of the vehicle and to allow movement of the vehicle responsive to second data content of the image data indicating that the portable camera unit is located inside the operator cab.

In one aspect, the vehicle can include a vehicle consist having plural interconnected vehicle units, with at least one of the plural vehicle units being a powered vehicle unit. The vehicle control unit can be configured to prevent movement of the vehicle consist responsive to the first data content of the image data indicating that the portable camera unit is positioned between adjacent vehicle units of the vehicle consist and to allow movement of the vehicle consist responsive to the second data content of the image data indicating that the portable camera unit is not positioned between adjacent vehicle units of the vehicle consist.

In one aspect, the vehicle control unit can include an image data analysis system configured to automatically process the image data for identifying the first data content and the second data content. The vehicle control unit can be configured to automatically prevent and allow movement of the vehicle responsive to the first data and the second data, respectively, that is identified by the image data analysis system. In one aspect, the system also includes the transportation system receiver configured to be located onboard the vehicle, where the transportation system receiver is configured to wirelessly communicate network data other than the image data at least one of onboard or off-board the vehicle and to automatically switch to a mode for receiving the image data from the portable camera unit responsive to the portable camera unit being active to communicate the image data. In one aspect, the system also includes a retractable mast configured for attachment to a vehicle. The retractable mast can include one or more mast segments deployable from a first position relative to the vehicle to a second position relative to the vehicle. The second position is higher than the first position. The mast also can include a coupler attached to one of the one or more mast segments and configured for detachable coupling of the portable camera unit to said one of the one or more mast segments. The portable camera unit is coupled to the retractable mast by way of the coupler and the retractable mast is deployed to the second position, with the portable camera unit positioned above the vehicle.

In another embodiment, another camera system is provided. The system can include a portable camera unit and an aerial device. The portable camera unit can include a camera configured to capture at least image data and at least one of a data storage device electrically connected to the camera and configured to store the image data or a communication device electrically connected to the camera and configured to wirelessly communicate the image data to a transportation system receiver located off-board the portable camera unit. The aerial device is configured for at least one of remote control or autonomous flying over a ground vehicle route. The aerial device includes a camera dock for receiving the portable camera unit. When in the camera dock, the portable camera unit is positioned for the camera to view the vehicle route.

In one aspect, the system includes an aerial device dock attached to a ground vehicle. The aerial device dock can be configured to receive the aerial device for at least one of detachable coupling of the aerial device to the ground vehicle or charging of a battery of the aerial device from a power source of the vehicle. In one aspect, the aerial device is a scale dirigible or a scale helicopter. In another embodiment, a method (e.g., for obtaining and/or analyzing image data for transportation data communication) is provided. The method includes obtaining image data from a portable camera unit having a camera configured to capture the image data and attached to a garment worn by a transportation worker, communicating the image data to a transportation system receiver located off-board the portable camera unit, determining a location of the transportation worker wearing the garment with a locator device, and autonomously controlling the portable camera unit based at least in part on the location of the transportation worker that is detected by the locator device.

In one aspect, the method also includes switching the portable camera unit to a first mode of operation responsive to the location of the transportation worker that is detected by the locator device indicating that the transportation worker is at an operator terminal of a vehicle and switching the portable camera unit to a different, second mode of operation responsive to the location of the transportation worker that is detected by the locator device indicating that the transportation worker is not at the operator terminal of the vehicle. In one aspect, the method also includes disabling the portable camera unit from at least one of capturing, storing, or communicating the image data responsive to determining that the portable camera unit is in the first mode of operation, and enabling the portable camera unit to said at least one of capturing, storing, or communicating the image data responsive to determining that the portable camera unit is in the second mode of operation.

In one aspect, the method also includes switching the portable camera unit to the first mode of operation responsive to the location of the transportation worker that is detected by the locator device indicating that the transportation worker is in an operator cab of the vehicle and switching the portable camera unit to the second mode of operation responsive to the location of the transportation worker that is detected by the locator device indicating that the transportation worker is not in the operator cab of the vehicle. In one aspect, the method also includes preventing movement of a vehicle responsive to first data content of the image data indicating that the portable camera unit is located outside an operator cab of the vehicle and allowing the movement of the vehicle responsive to second data content of the image data indicating that the portable camera unit is located inside the operator cab.

In one aspect, the method also includes preventing movement of a vehicle consist having plural interconnected vehicle units with at least one of the vehicle units including a powered vehicle unit. The movement of the vehicle consist can be prevented responsive to first data content of the image data indicating that the portable camera unit is positioned between adjacent vehicle units of the vehicle consist. The method may allow the movement of the vehicle consist responsive to the second data content of the image data indicating that the portable camera unit is not positioned between adjacent vehicle units of the vehicle consist. In one aspect, the method also can include autonomously examining the image data to one or more of identify or predict damage to one or more of a vehicle, a wayside asset, or a route being traveled upon by the vehicle.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other.

In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   a camera configured to capture at least image data;
   a data storage device electrically coupled to the camera and configured to store the image data,
   a communication device electrically coupled to the camera and configured to communicate the image data to a system receiver;
   a camera supporting object coupled to the camera;
   a locator device configured to detect a location of the camera supporting object; and
   a control unit configured to communicate with the system receiver and the locator device, and to control the camera based at least in part on the location of the camera supporting object,
   wherein the camera supporting object is coupled to a garment configured to be worn by a worker, and the control unit is configured to control the camera to a first mode of operation responsive to the location of the worker indicating that the worker is at an operator terminal and to control the camera to a different, second mode of operation responsive to the location of the worker indicating that the worker is not at the operator terminal.

2. The system of claim 1, wherein the system receiver comprises a transportation system receiver disposed onboard a vehicle, wherein the transportation system receiver is configured to communicate network data other than the image data to at least one of onboard or off-board the vehicle and to switch to a mode for receiving the image data from the camera responsive to the camera being active to communicate the image data.

3. The system of claim 2, wherein the transportation system receiver is configured to wirelessly transmit the network data off-board of the vehicle.

4. The system of claim 2, wherein the transportation system receiver is configured to transmit one or both of the network data and the image data onboard of the vehicle through an Ethernet network that is configured for the communication of data between the vehicle and one or more other vehicles.

5. A system, comprising:
   a camera configured to capture at least image data; and
   a data storage device electrically coupled to the camera and configured to store the image data, a communication device electrically coupled to the camera and configured to communicate the image data to a system receiver;
   a camera supporting object coupled to the camera;
   a locator device configured to detect a location of the camera supporting object; and
   a control unit configured to communicate with the system receiver and the locator device, and to control the camera based at least in part on the location of the camera supporting object detected, and
   the system receiver disposed onboard a vehicle, wherein the system receiver is configured to communicate network data other than the image data to at least one of onboard or off-board the vehicle and to switch to a mode for receiving the image data from the camera responsive to the camera being active to communicate the image data.

6. The system of claim 5, wherein the vehicle comprises a vehicle dock for coupling the aerial device to the vehicle, and when the aerial device is in the vehicle dock the camera is positioned to view the ground vehicle route.

7. The system of claim 5, wherein the vehicle comprises a vehicle dock for coupling the aerial device to the vehicle, and the vehicle dock is configured to charge a battery of the aerial device from a power source of the vehicle when the aerial device is docked in the vehicle dock.

8. The system of claim 5, wherein the vehicle comprises a vehicle dock for coupling the aerial device to the vehicle, wherein when the aerial device is in the vehicle dock the camera is positioned to view the ground vehicle route, and wherein the vehicle dock is configured to charge a battery of the aerial device from a power source of the vehicle when the aerial device is docked in the vehicle dock.

9. The system of claim 5, wherein the transportation system receiver is configured to wirelessly transmit the network data off-board of the vehicle.

10. The system of claim 5, wherein the transportation system receiver is configured to transmit one or both of the network data and the image data onboard of the vehicle through an Ethernet network that is configured for the communication of data between the vehicle and one or more other vehicles.

11. The system of claim 5, wherein the system comprises the communication device electrically coupled to the camera and configured to communicate the image data to a system receiver, the system receiver comprising a transportation system receiver disposed onboard the vehicle, wherein the transportation system receiver is configured to communicate network data other than the image data to at least one of onboard or off-board the vehicle and to switch to a mode for receiving the image data from the camera responsive to the camera being active to communicate the image data.

12. The system of claim 11, wherein the transportation system receiver is configured to wirelessly transmit the network data off-board of the vehicle.

13. The system of claim 11, wherein the transportation system receiver is configured to transmit one or both of the network data and the image data onboard of the vehicle through an Ethernet network that is configured for the communication of data between the vehicle and one or more other vehicles.

14. A system, comprising:
a camera configured to capture at least image data; and
at least one of a data storage device electrically coupled to the camera and configured to store the image data, or a communication device electrically coupled to the camera and configured to communicate the image data to a system receiver;
a camera supporting object coupled to the camera;
a locator device configured to detect a location of the camera supporting object; and
a control unit configured to communicate with the system receiver and the locator device, and to switch between a first mode of operation wherein the image data is stored within the camera on the data storage device, and a second mode of operation wherein the image data is transmitted off the camera to a remote storage device based at least in part on the location of the camera supporting object detected,
wherein the camera supporting object is a first ground vehicle configured for at least one of remote control or autonomous movement relative to a second ground vehicle along a route for the second vehicle, wherein the first ground vehicle is intended to travel along the route ahead of the second vehicle and to transmit the image data back to the second ground vehicle.

15. The system of claim 14, wherein the system comprises the communication device electrically coupled to the camera and configured to communicate the image data to a system receiver, the system receiver comprising a transportation system receiver disposed onboard the first ground vehicle, wherein the transportation system receiver is configured to communicate network data other than the image data to at least one of onboard or off-board the first ground vehicle and to switch to a mode for receiving the image data from the camera responsive to the camera being active to communicate the image data.

16. The system of claim 14, wherein the transportation system receiver is configured to wirelessly transmit the network data off-board of the first ground vehicle.

17. The system of claim 14, wherein the transportation system receiver is configured to transmit one or both of the network data and the image data onboard of the first ground vehicle through an Ethernet or wireless network that is configured for the communication of data between the first ground vehicle and the second ground vehicle.

18. The system of claim 1, wherein the modes of operation within the camera include a first mode of operation wherein the image data is stored within the camera on the data storage device, and a second mode of operation wherein the image data is transmitted off the camera to a remote storage device.

19. The system of claim 5, wherein modes of operation within the camera include a first mode of operation wherein the image data is stored within the camera on the data storage device, and a second mode of operation wherein the image data is transmitted off the camera to a remote storage device.

* * * * *